(12) United States Patent
Jakubowski et al.

(10) Patent No.: US 12,467,891 B2
(45) Date of Patent: Nov. 11, 2025

(54) DETERMINING CALCIFICATION IN A HOUSEHOLD APPLIANCE

(71) Applicant: WHIRLPOOL CORPORATION, Benton Harbor, MI (US)

(72) Inventors: Piotr Stanislaw Jakubowski, Wroclaw (PL); Wojciech Andrzej Barczyk, Wroclaw (PL); Joanna Elzbieta Kochanowska, Jelenia Gora (PL)

(73) Assignee: Whirlpool Corporation, Benton Harbor, MI (US)

( * ) Notice: Subject to any disclaimer, the term of this patent is extended or adjusted under 35 U.S.C. 154(b) by 327 days.

(21) Appl. No.: 18/308,707

(22) Filed: Apr. 28, 2023

(65) Prior Publication Data

US 2023/0375490 A1 Nov. 23, 2023

(30) Foreign Application Priority Data

May 17, 2022 (EP) .................................... 22173912

(51) Int. Cl.
| | |
|---|---|
| *G01N 25/18* | (2006.01) |
| *F24H 9/00* | (2022.01) |
| *F24H 15/104* | (2022.01) |
| *F24H 15/219* | (2022.01) |
| *F24H 15/288* | (2022.01) |
| *F24H 15/395* | (2022.01) |

(52) U.S. Cl.
CPC ............ *G01N 25/18* (2013.01); *F24H 9/0042* (2013.01); *F24H 15/104* (2022.01); *F24H 15/219* (2022.01); *F24H 15/288* (2022.01); *F24H 15/395* (2022.01)

(58) Field of Classification Search
CPC ..... G01N 25/18; F24H 9/0042; F24H 15/288; F24H 15/104; F24H 15/219; F24H 15/395

See application file for complete search history.

(56) References Cited

U.S. PATENT DOCUMENTS

| | | | |
|---|---|---|---|
| 5,283,854 A | 2/1994 | Schiebelhuth | |
| 5,992,298 A | 11/1999 | Illy et al. | |
| 6,082,245 A | 7/2000 | Nicolai | |
| 6,236,321 B1 * | 5/2001 | Troost, IV | ............ F24H 9/0042 |
| | | | 126/116 A |
| 9,851,322 B2 * | 12/2017 | Dagan | ..................... F24H 15/20 |

(Continued)

FOREIGN PATENT DOCUMENTS

| | | |
|---|---|---|
| DE | 60031520 T2 | 6/2007 |
| EP | 2080461 A1 | 7/2009 |

(Continued)

*Primary Examiner* — Randy W Gibson
(74) *Attorney, Agent, or Firm* — McGarry Bair PC

(57) ABSTRACT

A method of determining calcification of at least a portion of a water heating assembly in a home appliance having a treating chamber. The method includes supplying heated water to the treating chamber via the water heating assembly. The water heating assembly includes a heating element that is selectively energized. A number of thermostat trips are sensed during at least a portion of a cycle of operation. A water temperature value indicative of a water temperature can be sensed. A calcification level of the heating element or the at least a portion of the water heating assembly can be determined based on the number of thermostat trips and the water temperature value.

20 Claims, 7 Drawing Sheets

(56) References Cited

U.S. PATENT DOCUMENTS

2014/0005834 A1 1/2014 Hoffman
2021/0332830 A1 10/2021 Schmieder et al.

FOREIGN PATENT DOCUMENTS

| EP | 2842474 A1 | 3/2015 |
|---|---|---|
| KR | 20040020718 A | 3/2004 |
| WO | 2018/127279 A1 | 7/2018 |

* cited by examiner

DETERMINING CALCIFICATION IN A HOUSEHOLD APPLIANCE

CROSS-REFERENCE TO RELATED APPLICATION

This application claims priority to European Patent Application No. 221739121, filed May 17, 2022, which is incorporated herein by reference its entirety.

TECHNICAL FIELD

This disclosure generally relates to a method of detecting calcification in a household appliance, and more specifically, detecting calcification in a portion of a water heating assembly of a household appliance.

BACKGROUND

Scale or calcium deposit can form when heat energy separates calcium from water. The calcium can accumulate over time and cause calcification of at least a portion of a water heater. The efficiency of the water heater can be impacted by the thickness of the calcification. The amount of surface area adjacent the heating element covered in calcium deposits can also impact the efficiency of the water heater.

BRIEF DESCRIPTION

The disclosure relates to a method of determining calcification of a at least a portion of a water heating assembly in a home appliance having a treating chamber, the method comprising supplying heated water to the treating chamber according to a cycle of operation by operating a pump to flow water through the water heating assembly to the treating chamber, and selectively energizing a heating element of the water heating assembly according to a thermostat to heat the water as it flows through the water heating assembly, sensing a number of thermostat trips during at least a portion of the cycle of operation, sensing a water temperature value indicative of a water temperature of the heated water corresponding to at least one of the thermostat trips, and determining a calcification level of the water heating assembly based on the number of thermostat trips and the water temperature value.

DETAILED DESCRIPTION

Figure 1:
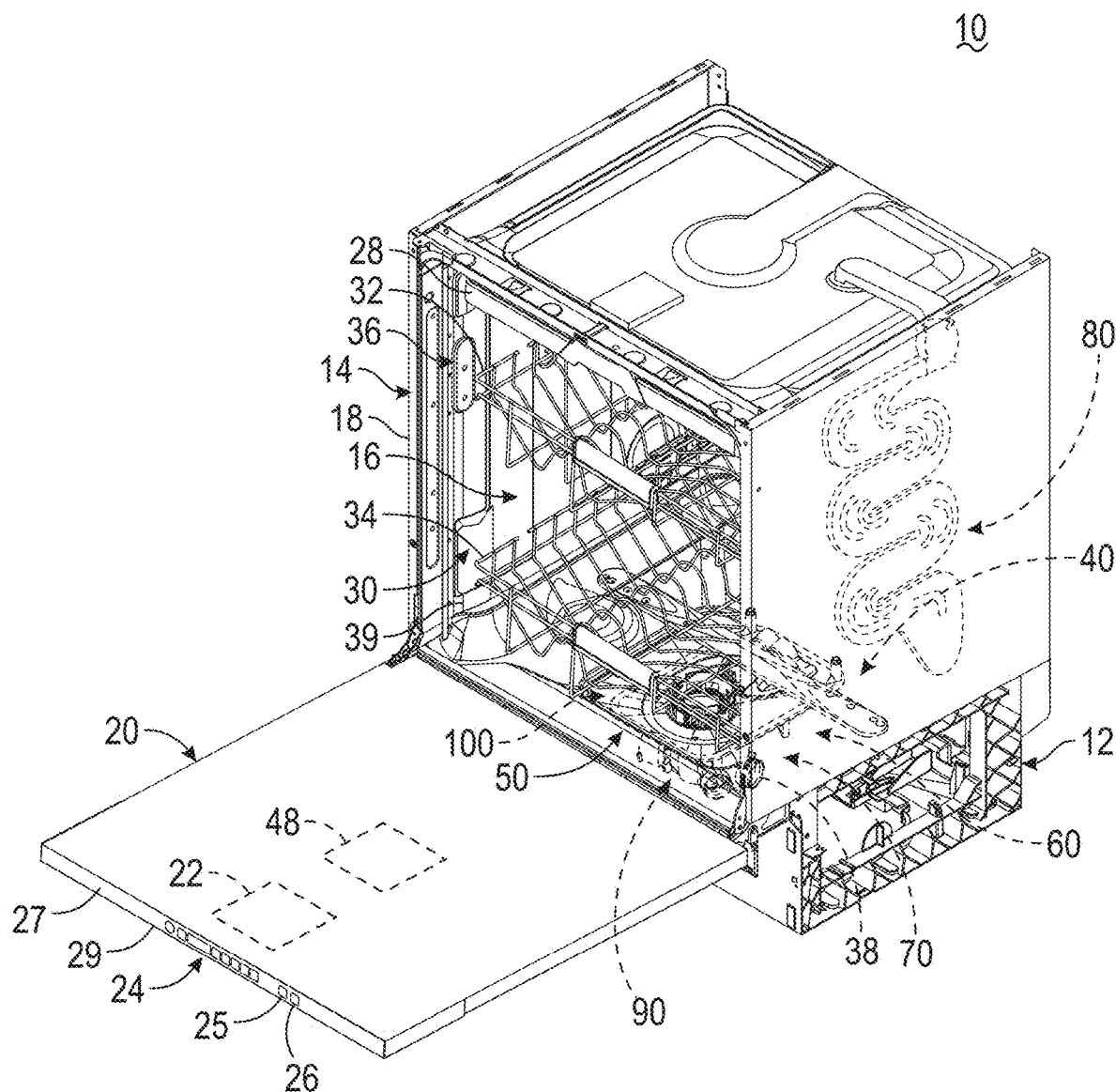
FIG. 1 is a right-side perspective view of an automatic dishwasher having multiple systems for implementing an automatic cycle of operation.

FIG. 1 illustrates a household appliance as an automatic dishwasher 10 capable of implementing an automatic cycle of operation to treat dishes. Although much of the remainder of this application will focus on the aspect of determining calcification in an automatic dishwasher, the present disclosure can have utility in other environments, including other household appliances, such as a washing machine capable of implementing an automatic cycle of operation on clothing, where the cycle of operation includes heating water.

As used in this description, the term "dish(es)" is intended to be generic to any item, single or plural, that can be treated in the dishwasher 10, including, without limitation, dishes, plates, pots, bowls, pans, glassware, and silverware. As illustrated, the dishwasher 10 is a built-in dishwasher implementation, which is designed for mounting under a countertop. However, this description is applicable to other dishwasher implementations such as a stand-alone, drawer-type or a sink-type, for example.

The dishwasher 10 has a variety of systems, some of which are controllable, to implement the automatic cycle of operation. A chassis is provided to support the variety of systems needed to implement the automatic cycle of operation. As illustrated, for a built-in implementation, the chassis includes a frame in the form of a base 12 on which is supported an open-faced tub 14, which at least partially defines a treating chamber 16, having an open face 18, for receiving the dishes. A closure in the form of a door assembly 20 is pivotally mounted to the base 12 for movement between opened and closed positions to selectively open and close the open face 18 of the tub 14. Thus, the door assembly 20 provides selective accessibility to the treating chamber 16 for the loading and unloading of dishes or other items. While illustrated as a single panel, multiple parts can together define the door assembly 20.

The chassis, as in the case of the built-in dishwasher implementation, can be formed by other parts of the dishwasher 10, like the tub 14 and the door assembly 20, in addition to a dedicated frame structure, like the base 12, with them all collectively forming a uni-body frame to which the variety of systems are supported. In other implementations, like the drawer-type dishwasher, the chassis can be a tub that is slidable relative to a frame, with the closure being a part of the chassis or the countertop of the surrounding cabinetry. In a sink-type implementation, the sink forms the tub and the cover closing the open top of the sink forms the closure. Sink-type implementations are more commonly found in recreational vehicles.

The systems supported by the chassis, while essentially limitless, can include dish holding system 30, spray system 40, recirculation system 50, drain system 60, water supply system 70, drying system 80, water heating assembly 90, and filter system 100. These systems are used to implement one or more treating cycles of operation for the dishes, for which there are many, and one of which includes a traditional automatic wash cycle.

A basic traditional automatic wash cycle of operation has a wash phase, where a detergent/water mixture is recirculated and then drained, which is then followed by a rinse phase where water alone or with a rinse agent is recirculated and then drained. An optional drying phase can follow the rinse phase. More commonly, the automatic wash cycle has multiple wash phases and multiple rinse phases. The multiple wash phases can include a pre-wash phase where water, with or without detergent, is sprayed or recirculated on the dishes, and can include a dwell or soaking phase. There can be more than one pre-wash phases. A wash phase, where water with detergent is recirculated on the dishes, follows the pre-wash phases. There can be more than one wash phase; the number of which can be sensor controlled based on the amount of sensed soils in the wash liquid. One or more rinse phases will follow the wash phase(s), and, in some cases, come between wash phases. The number of wash phases can also be sensor controlled based on the amount of sensed soils in the rinse liquid. The wash phases and rinse phases can include the heating of the water, even to the point of one or more of the phases being hot enough for long enough to sanitize the dishes. A drying phase can follow the rinse phase(s). The drying phase can include a drip dry, heated dry, condensing dry, air dry or any combination.

A controller 22 can also be included in the dishwasher 10 and operably couples with and controls the various components of the dishwasher 10 to implement the cycle of operation. The controller 22 can be located within the door assembly 20 as illustrated, or it can alternatively be located somewhere within the chassis. The controller 22 can also be operably coupled with a control panel or user interface 24 for receiving user-selected inputs and communicating information to the user. The user interface 24 can include operational controls such as dials, lights, switches, and displays enabling a user to input commands, such as a cycle of operation, to the controller 22 and receive information. The user interface 24 can include a calcification portion 25 or a decalcification cycle indicator 26.

While illustrated at a top portion 27 of the door assembly 20, it is contemplated that the user interface 24 or portions of the user interface 24, including the calcification portion 25 or a decalcification cycle indicator 26, can be located at a front side 29 of the door assembly 20. It is further contemplated that the user interface 24 or portions of the user interface 24 can be on the side of the door assembly 20 or projected on the floor adjacent the door assembly 20.

The dish holding system 30 can include any suitable structure for holding dishes within the treating chamber 16. Exemplary dish holders are illustrated in the form of upper dish racks 32 and lower dish rack 34, commonly referred to as "racks", which are located within or moveably received by the treating chamber 16. The upper dish racks 32 and the lower dish rack 34 are typically mounted for slidable movement in and out of the treating chamber 16 through the open face 18 for ease of loading and unloading. Drawer guides/slides/rails 36 are typically used to slidably mount the upper dish rack 32 to the tub 14. The lower dish rack 34 typically has wheels or rollers 38 that roll along rails 39 formed in sidewalls of the tub 14 and onto the door assembly 20, when the door assembly 20 is in the opened position.

Dedicated dish holders can also be provided. One such dedicated dish holder is a third level rack 28 located above the upper dish rack 32. Like the upper dish rack 32, the third level rack 28 is slidably mounted to the tub 14 with drawer guides/slides/rails 36 and movably received within the treating chamber 16. The third level rack 28 is typically used to hold utensils, such as tableware, spoons, knives, spatulas, etc., in an on-the-side or flat orientation. However, the third level rack 28 is not limited to holding utensils. If an item can fit in the third level rack, it can be washed in the third level rack 28. The third level rack 28 generally has a much shorter height or lower profile than the upper and lower dish racks 32, 34. Typically, the height of the third level rack is short enough that a typical glass cannot be stood vertically in the third level rack 28 and the third level rack 28 still slide into the treating chamber 16.

Another dedicated dish holder can be a silverware basket (not shown), which is typically carried by one of the upper or lower dish racks 32, 34 or mounted to the door assembly 20. The silverware basket typically holds utensils and the like in an upright orientation as compared to the on-the-side or flat orientation of the third level rack 28.

A dispenser assembly 48 is provided to dispense treating chemistry, e.g. detergent, anti-spotting agent, etc., into the treating chamber 16. The dispenser assembly 48 can be mounted on an inner surface of the door assembly 20, as shown, or can be located at other positions within the chassis. The dispenser assembly 48 can dispense one or more types of treating chemistries. The dispenser assembly 48 can be a single-use dispenser or a bulk dispenser, or a combination of both.

Figure 2:
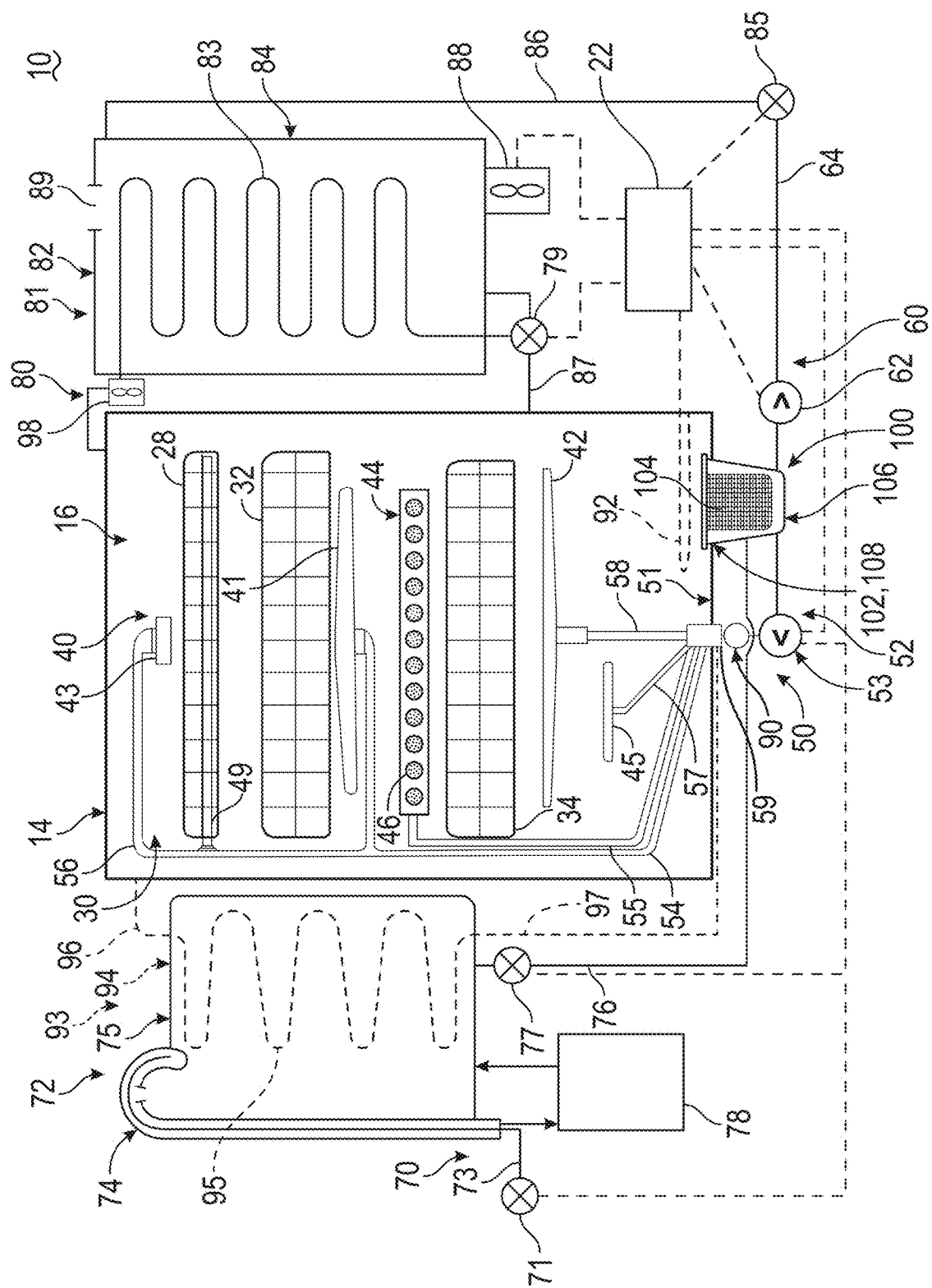
FIG. 2 is a schematic view of the dishwasher of FIG. 1 and illustrating at least some of the plumbing and electrical connections between at least some of the multiple systems.

Turning to FIG. 2, the spray system 40 is provided for spraying liquid in the treating chamber 16 and can have multiple spray assemblies or sprayers, some of which can be dedicated to a particular one of the dish holders, to particular area of a dish holder, to a particular type of cleaning, or to a particular level of cleaning, etc. The sprayers can be fixed or movable, such as rotating, relative to the treating chamber 16 or dish holder. Six exemplary sprayers are illustrated and include, an upper spray arm 41, a lower spray arm 42, a third level sprayer 43, a deep-clean sprayer 44, and a spot sprayer 45. The upper spray arm 41 and lower spray arm 42 are illustrated as rotating spray arms, located below the upper dish rack 32 and the lower dish rack 34, respectively, and rotate about a generally centrally located and vertical axis. However, it is contemplated that the upper spray arm 41 or the lower spray arm 42 can be fixed. The third level sprayer 43 is located above the third level rack 28. The third level sprayer 43 is illustrated as being fixed, but could move, such as in rotating. In addition to the third level sprayer 43 or in place of the third level sprayer 43, a sprayer 49, illustrated as a stationary sprayer, can be located at least in part below a portion of the third level rack 28. The sprayer 49 is illustrated as a having a fixed or stationary sprayer housing or tube, carried by the third level rack 28, but the sprayer housing or tube could move, such as, but not limited to, rotating about a longitudinal axis.

The deep-clean sprayer 44 is a manifold extending along a rear wall of the tub 14 and has multiple nozzles 46, with multiple apertures, generating an intensified and/or higher pressure spray than the upper spray arm 41, the lower spray arm 42, or the third level sprayer 43. The nozzles 46 can be fixed or move, such as in rotating. The spray emitted by the deep-clean sprayer 44 defines a deep clean zone, which, as illustrated, would like along a rear side of the lower dish rack 34. Thus, dishes needing deep cleaning, such as dishes with baked-on food, can be located in the lower dish rack 34 to face the deep-clean sprayer 44. The deep-clean sprayer 44, while illustrated as only one unit on a rear wall of the tub 14 could comprises multiple units and/or extend along multiple portions, including different walls, of the tub 14, and can be provide above, below or beside any of the dish holders with deep-cleaning is desired.

The spot sprayer 45, like the deep-clean sprayer, can emit an intensified and/or higher pressure spray, especially to a discrete location within one of the dish holders. While the spot sprayer 45 is shown below the lower dish rack 34, it could be adjacent any part of any dish holder or along any wall of the tub where special cleaning is desired. In the illustrated location below the lower dish rack 34, the spot sprayer can be used independently of or in combination with the lower spray arm 42. The spot sprayer 45 can be fixed or can move, such as in rotating.

These six sprayers are illustrative examples of suitable sprayers and are not meant to be limiting as to the type of suitable sprayers.

The recirculation system 50 recirculates the liquid sprayed into the treating chamber 16 by the sprayers of the spray system 40 back to the sprayers to form a recirculation loop or circuit by which liquid can be repeatedly and/or continuously sprayed onto dishes in the dish holders. The recirculation system 50 can include a sump 51, a pump assembly 52, and the water heating assembly 90. The sump 51 collects the liquid sprayed in the treating chamber 16 and can be formed by a sloped or recess portion of a bottom wall of the tub 14. The pump assembly 52 can include one or more pumps such as recirculation pump 53. The sump 51 can also be a separate module that is affixed to the bottom wall and include the pump assembly 52.

Multiple supply conduits 54, 55, 56, 57, 58 fluidly couple the sprayers 43, 44, 45, 49 to the recirculation pump 53. A recirculation valve 59 can selectively fluidly couple each of the conduits 54-58 to the recirculation pump 53. While each sprayer 43, 44, 45, 49 is illustrated as having a corresponding dedicated supply conduit 54-58 one or more subsets, comprising multiple sprayers from the total group of sprayers 43, 44, 45, 49, can be supplied by the same conduit, negating the need for a dedicated conduit for each sprayer. For example, a single conduit can supply the upper spray arm 41 and the third level sprayer 43. Another example is that the sprayer 49 is supplied liquid by the conduit 56, which also supplies the third level sprayer 43.

The recirculation valve 59, while illustrated as a single valve, can be implemented with multiple valves. Additionally, one or more of the conduits can be directly coupled to the recirculation pump 53, while one or more of the other conduits can be selectively coupled to the recirculation pump with one or more valves.

The water heating assembly 90 is illustrated as downstream of the recirculation pump 53 and upstream of the recirculation valve 59, however other locations in the recirculation system 50 are contemplated. Water flowing through the water heating assembly 90 is heated and provided to the treating chamber 16. It is contemplated that the water heating assembly 90 can be multiple heating assemblies located in one or more portions of the recirculation system 50 or the water supply system 70.

There are essentially an unlimited number of plumbing schemes to connect the water heating assembly 90 and the recirculation system 50 to the spray system 40. The illustrated plumbing is not limiting.

A drain system 60 drains liquid from the treating chamber 16. The drain system 60 includes a drain pump 62 fluidly coupled the treating chamber 16 to a drain line 64. As illustrated the drain pump 62 fluidly couples the sump 51 to the drain line 64.

While separate recirculation and drain pumps 53 and 62 are illustrated, a single pump can be used to perform both the recirculating and the draining functions. Alternatively, the drain pump 62 can be used to recirculate liquid in combination with the recirculation pump 53. When both a recirculation pump 53 and drain pump 62 are used, the drain pump 62 is typically more robust than the recirculation pump 53 as the drain pump 62 tends to have to remove solids and soils from the sump 51, unlike the recirculation pump 53, which tends to recirculate liquid which has solids and soils filtered away to some extent.

A water supply system 70 is provided for supplying fresh water to the dishwasher 10 from a household water supply via a household water valve 71. The water supply system 70 includes a water supply unit 72 having a water supply conduit 73 with a siphon break 74. While the water supply conduit 73 can be directly fluidly coupled to the tub 14 or any other portion of the dishwasher 10, the water supply conduit is shown fluidly coupled to a supply tank 75, which can store the supplied water prior to use. The supply tank 75 is fluidly coupled to the sump 51 by a supply line 76, which can include a controllable valve 77 to control when water is released from the supply tank 75 to the sump 51.

The supply tank 75 can be conveniently sized to store a predetermined volume of water, such as a volume required for a phase of the cycle of operation, which is commonly referred to as a "charge" of water. The storing of the water in the supply tank 75 prior to use is beneficial in that the water in the supply tank 75 can be "treated" in some manner, such as softening or heating prior to use.

A water softener 78 is provided with the water supply system 70 to soften the fresh water. The water softener 78 is shown fluidly coupling the water supply conduit 73 to the supply tank 75 so that the supplied water automatically passes through the water softener 78 on the way to the supply tank 75. However, the water softener 78 could directly supply the water to any other part of the dishwasher 10 than the supply tank 75, including directly supplying the tub 14. Alternatively, the water softener 78 can be fluidly coupled downstream of the supply tank 75, such as in-line with the supply line 76. Wherever the water softener 78 is fluidly coupled, it can be done so with controllable valves, such that the use of the water softener 78 is controllable and not mandatory.

A drying system 80 is provided to aid in the drying of the dishes during the drying phase. The drying system as illustrated includes a condensing assembly 81 having a condenser 82 formed of a serpentine conduit 83 with an inlet fluidly coupled to an upper portion of the tub 14 and an outlet fluidly coupled to a lower portion of the tub 14, whereby moisture laden air within the tub 14 is drawn from the upper portion of the tub 14, passed through the serpentine conduit 83, where liquid condenses out of the moisture laden air and is returned to the treating chamber 16 where it ultimately evaporates or is drained via the drain pump 62. The serpentine conduit 83 can be operated in an open loop configuration, where the air is exhausted to atmosphere, a closed loop configuration, where the air is returned to the treating chamber, or a combination of both by operating in one configuration and then the other configuration.

To enhance the rate of condensation, the temperature difference between the exterior of the serpentine conduit 83 and the moisture laden air can be increased by cooling the exterior of the serpentine conduit 83 or the surrounding air. To accomplish this, an optional cooling tank 84 is added to the condensing assembly 81, with the serpentine conduit 83 being located within the cooling tank 84. The cooling tank 84 is fluidly coupled to at least one of the spray system 40, recirculation system 50, drain system 60 or water supply system 70 such that liquid can be supplied to the cooling tank 84. The liquid provided to the cooling tank 84 from any of the systems 40-70 can be selected by source and/or by phase of cycle of operation such that the liquid is at a lower temperature than the moisture laden air or even lower than the ambient air.

As illustrated, the liquid is supplied to the cooling tank 84 by the drain system 60. A valve 85 fluidly connects the drain line 64 to a supply conduit 86 fluidly coupled to the cooling tank 84. A return conduit 87 fluidly connects the cooling tank 84 back to the treating chamber 16 via a return valve 79. In this way a fluid circuit is formed by the drain pump 62, drain line 64, valve 85, supply conduit 86, cooling tank 84, return valve 79 and return conduit 87 through which liquid can be supplied from the treating chamber 16, to the cooling tank 84, and back to the treating chamber 16. Alternatively, the supply conduit 86 could fluidly couple to the drain line 64 if re-use of the water is not desired.

To supply cold water from the household water supply via the household water valve 71 to the cooling tank 84, the water supply system 70 would first supply cold water to the treating chamber 16, then the drain system 60 would supply the cold water in the treating chamber 16 to the cooling tank 84. It should be noted that the supply tank 75 and cooling tank 84 could be configured such that one tank performs both functions.

The drying system 80 can use ambient air, instead of cold water, to cool the exterior of the serpentine conduit 83. In such a configuration, a blower 88 is connected to the cooling tank 84 and can supply ambient air to the interior of the cooling tank 84. The cooling tank 84 can have a vented top 89 to permit the passing through of the ambient air to allow for a steady flow of ambient air blowing over the serpentine conduit 83.

The cooling air from the blower 88 can be used in lieu of the cold water or in combination with the cold water. The cooling air will be used when the cooling tank 84 is not filled with liquid. Advantageously, the use of cooling air or cooling water, or combination of both, can be selected on the site-specific environmental conditions. If ambient air is cooler than the cold water temperature, then the ambient air can be used. If the cold water is cooler than the ambient air, then the cold water can be used. Cost-effectiveness can also be considered or accounted for when selecting between cooling air and cooling water. The blower 88 can be used to dry the interior of the cooling tank 84 after the water has been drained. Suitable temperature sensors for the cold water and the ambient air can be provided and send their temperature signals to the controller 22, which can determine which of the two is colder at any time or phase of the cycle of operation.

Optionally, a heater 92, such as an immersion heater, can be located in the treating chamber 16 at a location where it will be immersed by the water supplied to the treating chamber 16.

Optionally, a heating circuit 93 having a heat exchanger 94, illustrated as a serpentine conduit 95, can be located within the supply tank 75, with a supply conduit 96 supplying liquid from the treating chamber 16 to the serpentine conduit 95, and a return conduit 97 fluidly coupled to the treating chamber 16. The heating circuit 93 is fluidly coupled to the recirculation pump 53 either directly or via the recirculation valve 59 such that liquid that is heated as part of a cycle of operation can be recirculated through the heat exchanger 94 to transfer the heat to the charge of fresh water residing in the supply tank 75. Most wash phases use liquid that is heated by the water heating assembly 90 or optional heater 92. The heated water can be recirculated through the heating circuit 93 to transfer the heat to the charge of water in the supply tank 75, which is typically used in the next phase of the cycle of operation.

A filter system 100 is provided to filter un-dissolved solids from the liquid in the treating chamber 16. The filter system 100 includes a coarse filter 102 and a fine filter 104, which can be a removable basket 106 residing the sump 51, with the coarse filter 102 being a screen 108 circumscribing the removable basket 106. Additionally, the recirculation system 50 can include a rotating filter in addition to or in place of the either or both of the coarse filter 102 and fine filter 104. Other filter arrangements are contemplated such as an ultra-filtration system.

Figure 3:
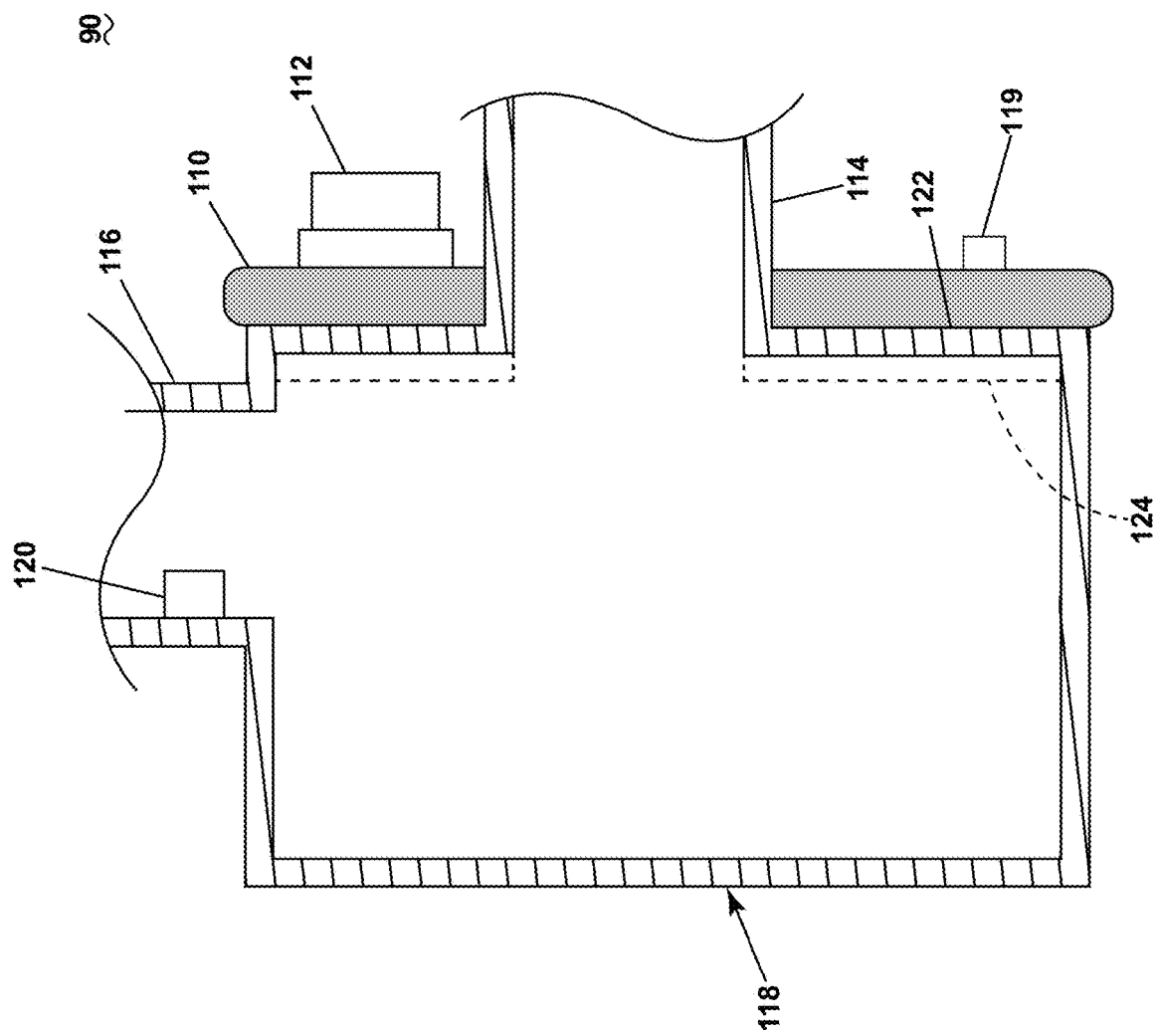
FIG. 3 is a schematic view of a water heating assembly of the dishwasher of FIGS. 1 and 2.

FIG. 3 schematically illustrates the water heating assembly 90, which is illustrated as flow through or in-line water heater having a conduit or tank 118, with an inlet 114 and outlet 116. A heating element 110 conductively transmits heat into the tank 118. A thermostat 112 senses the temperature of the heating element 110 for control of the energizing/deenergizing of the heating element 110.

The heating element 110 is illustrated as a plate-type heater, however, different types of heating elements are contemplated. For example, the heating element 110 can be a coil or plate that circumscribes the tank 118. It is also contemplated that the heating element 110 can be a plurality of heating elements, where the plurality of heating elements can be different types of heaters, which can be operated dependently or independently.

The thermostat 112 directly or indirectly senses or determines the temperature of the heating element 110. The thermostat 112 can trip when the sensed or determined temperature of the heating element 110 meets or exceed a predetermined threshold. When the thermostat 112 trips, power to the heating element 110 ceases. That is, when the thermostat 112 trips, power to the heating element 110 is removed. The removal of electricity due to a thermostat 112 trip is temporary.

The thermostat 112 or the heating element 110 can be in communication with a thermal fuse 119. When the thermal fuse is blown, electricity is no longer supplied to the heating element 110. The removal of electricity to the heating element 110 via the thermal fuse 119 can be permanent until the thermal fuse 119 is replaced.

The inlet 114 is illustrated, by way of example, at the heating element 110, however, it is contemplated that the inlet 114 can be positioned separate from the heating element 110. Further, while illustrated as unitarily formed, the inlet 114, the outlet 116, and the heating tank 118 can be any number of components coupled together. It is also contemplated that additional or different materials can be used to form various portions of the heating tank 118, such as a sidewall 122 adjacent the heating element 110. That is, the heat tank 118 can be made of several different materials where, for example, the sidewall 122 is a thermally conductive material and the remainder of the heat tank 118 can include materials that are thermally insulating. Additionally, or alternatively, the sidewall 122 can be unitarily formed with the heating element 110.

A water sensor can be located at or adjacent the outlet 116. The water sensor can be a temperature sensor 120 can provide an output that corresponds to a water temperature value. The water temperature value is indicative of the water temperature of the heated water entering the treating chamber 16 downstream of the water heating assembly 90.

The water sensor or the temperature sensor 120 can directly or indirectly measure water temperature at the outlet 116. The temperature sensor 120 can be any known sensor such as, but not limited to, a thermistor. While illustrated as at or adjacent the outlet 116 of the water heating assembly 90, the temperature sensor 120 can be located, for example, at or adjacent the inlet 114. By way of further non-limiting example, the temperature sensor 120 can be located in or adjacent the heating tank 118, in or adjacent the inlet to the sump 51, inside or adjacent the inlet or outlet of the pump 53, or between the water heating assembly 90 and the recirculation valve 59 (FIG. 2). That is, the sensor 120 can be located in any portion of the recirculation system 50 or the water supply system 70. The temperature sensor 120 can be a combination of sensors used to determine one or more temperatures used to find an average or representative water temperature.

A calcium layer 124 can form in one or more portions of the water heating assembly 90 during normal use and operation. The calcium layer 124 can be at the sidewall 122 adjacent the heating element 110, however other locations are contemplated.

Figure 4:
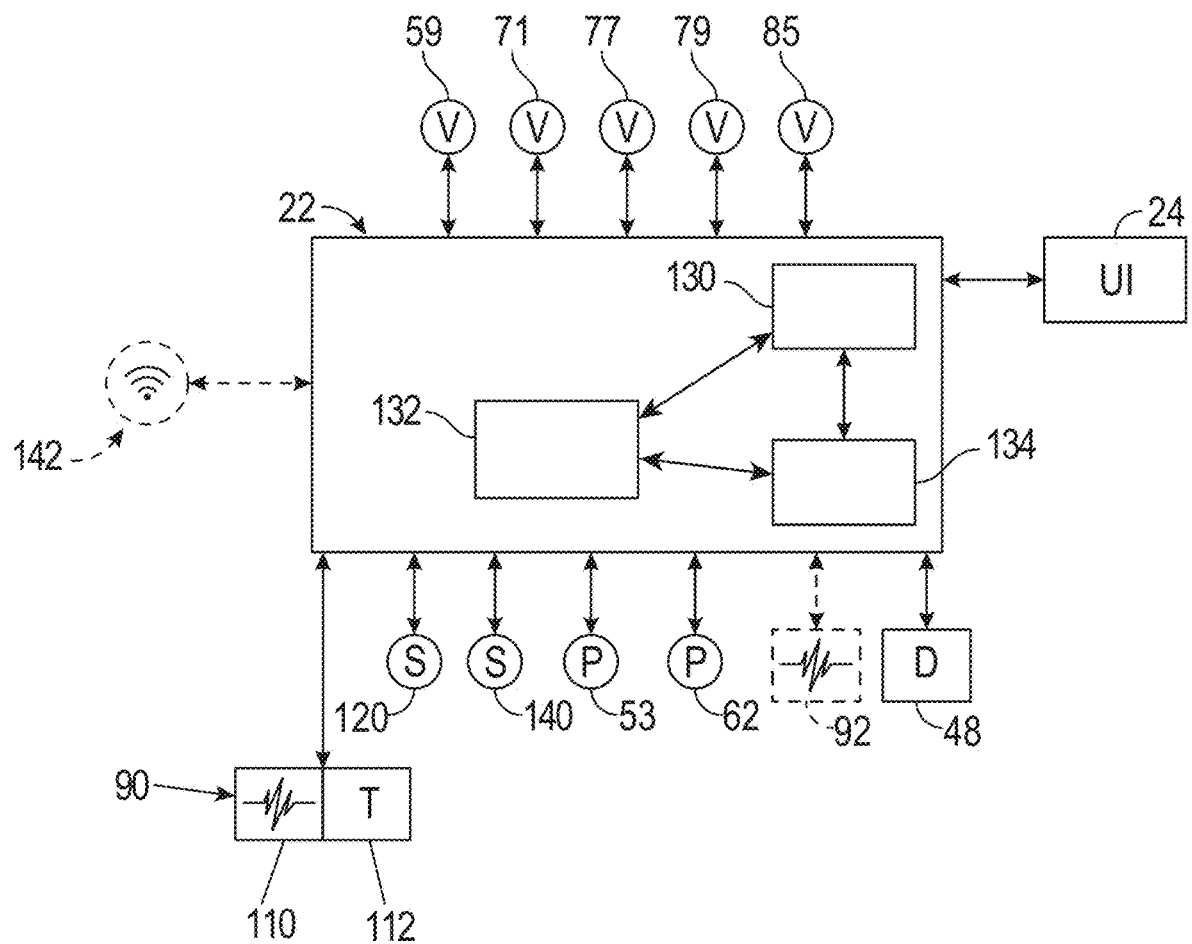
FIG. 4 is a schematic view of a controller of the dishwasher of FIGS. 1 and 2.

As illustrated schematically in FIG. 4, the controller 22 can be coupled with components or subcomponents of the dishwasher 10. Components that are coupled to the controller 22 can send and receive signals. Additionally, the controller 22 can sense, monitor, and control the electricity supplied to the coupled components. Further, if the component has subcomponents, for example a sensor and a motor, the subcomponents (motor and sensor) can independently communicate with the controller 22.

That is, the controller 22 is coupled to the water heating assembly 90 and optionally coupled to the heater 92. The controller 22 can determine if the thermostat 112 of the water heating assembly 90 trips by detecting the output from the thermostat 112. Alternatively, the thermostat 112 trip can be detected by a sudden decrease or removal of the current or power supplied to the heating element 110 of the water heating assembly 90. That is, the controller 22 can control, sense, and monitor the thermostat 112, the electricity supplied to the heating element 110, or both. It is also contemplated that an additional sensor (not shown) can provide the controller 22 with voltage or current measurements indicative of the power provided to the heating element 110.

The controller 22 is coupled to the drain pump 62 for draining liquid from the treating chamber 16, and the recirculation pump 53 for recirculating the wash liquid during the cycle of operation. The controller 22 can sense, monitor, or change how much electricity is supplied to a motor (not shown) of the recirculation pump 53.

The temperature sensor 120 can provide an output value to the controller 22, where the output value can be indicative of the temperature of the heated water downstream of the water heating assembly 90 and upstream of the treating chamber 16. Alternatively, the output value can be received by the controller 22, which can use the output value to determine a water temperature value indicative of the water temperature of the heated water.

Instead of continuously receiving an output from the temperature sensor 120, the controller 22 can prompt the temperature sensor 120 to send the output value.

The controller 22 can also send signals or receive input from one or more sensors 140. Non-limiting examples of sensors that can be communicably coupled with the controller 22 include, to name a few, water level sensor, electromechanical pressure switches, pressure switches, ambient air temperature sensor, treating chamber temperature sensor, door open/close sensor, and turbidity sensor.

The controller 22 can also communicate with the recirculation valve 59, the household water valve 71, the controllable valve 77, the return valve 79, and the valve 85.

A memory 130, a heater calcification detection (HCD) module 132, and a central processing unit (CPU) 134 can be included in or in communication with the controller 22. While illustrated as distinct from the CPU 134, it is contemplated that the HCD module 132 is part of or run by the CPU 134.

The memory 130 can be used for storing control software or lookup information used by the HCD module 132 or the CPU 134. The stored information can include completing a cycle of operation using the dishwasher 10 and any additional software. For example, the memory 130 can store one or more pre-programmed automatic cycles of operation that can be selected by a user and executed by the dishwasher 10.

The controller 22 is coupled to the user interface 24. The controller 22 can receive input from a user at the user interface 24. Additionally, the controller 22 can provide an output via the user interface 24 to provide information to the user.

Optionally, the controller 22 can include or communicate with a wireless communication device 142.

Figure 5:
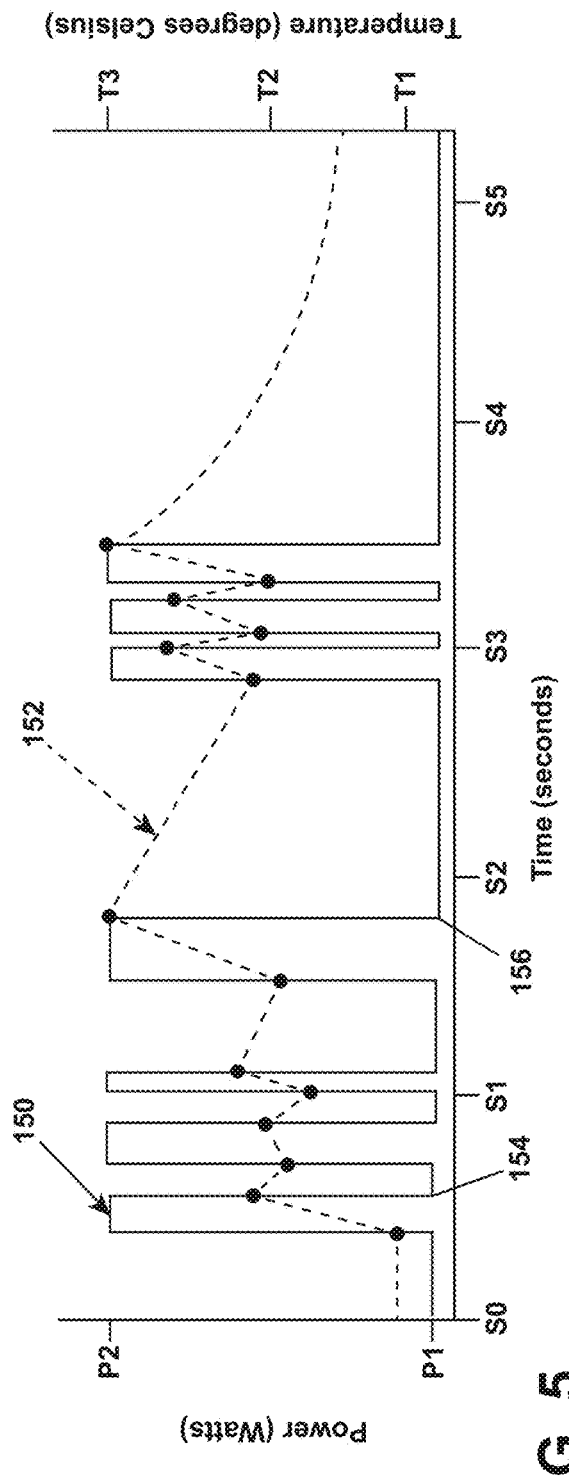
FIG. 5 is a plot graph illustrating aspects of power and temperature characteristics of the water heating assembly of FIG. 4.

FIG. 5 is a plot graph illustrating power and temperature characteristics of. A power 150 provided to the heating element 110 (FIG. 4) and temperature 152 of the heated water provided by the water heating assembly 90 (FIG. 4) verses time in seconds from time S0 to S5 of a cycle of operation. The water heating assembly 90 (FIG. 4) represented by FIG. 5 has little to no calcification. That is, the thickness of the calcification layer 124 is zero, very thin, or incomplete. In other words, the heating element 110 (FIG. 4) is operating in a "normal" capacity.

The power 150 can be in watts, although any measurement of power, voltage, or current (with known resistance) is contemplated. That is, the controller 22 (FIG. 3) can detect or sense the amount of current provided to the heating element 110 (FIG. 4) and calculate the power provided to the heating element 110 (FIG. 4). The calculated power can be based on the known voltage and known resistance of the heating element 110 (FIG. 4) and the detected or sensed current.

A first power level P1 can indicative of zero watts. The first power level P1 can also correspond the heating element 110 (FIG. 4) in a non-operational or switched off state. A second power level P2 can be indicative of an operational or switched on state of the heating element 110 (FIG. 4). While illustrated at every peak to reach the second power level P2, it is contemplated that peaks of the power 150 can fluctuate. The peaks (or highest power value) of the power 150 can be within 10% of the second power level P2. That is, the heating element (FIG. 4) does not always draw (nor is it always provided) the exact same amount of power when switched on.

A first temperature T1 can be indicative of the water received by the water heating assembly 90 prior to switching on the heating element 110 (FIG. 4). An increase in the temperature can be seen during times of the cycle in which the power 150 is at or near the second power level P2. A second temperature T2 illustrates the temperature of the water at the end of the first heating cycle. That is, the second temperature T2 correlates to the water temperature when the heating element 110 is first de-energized or tripped, where power is initially removed from the heating element 110 (FIG. 4). Optionally, the power 150 can be removed from the heating element 110 (FIG. 4) to generate the first de-energization or first trip because the water reached a water temperature threshold indicative of T2. Alternatively, the power 150 can be removed from the heating element 110 (FIG. 4) due to a maximum length of time in which the heater element 110 (FIG. 4), according to the cycle of operation, is reached. Still further, the heater element 110 can be tripped by the thermostat 112.

A third temperature T3 indicates the maximum water temperature reached during the cycle of operation between times S0 and S5. This can be a desired water threshold or a predetermined percentage below boiling. For example, the third temperature T3 can be 75 degrees Celsius or within 10% of 75 degrees Celsius, however any temperate at or under boiling (approximately 100 degrees Celsius) is contemplated.

By way of non-limiting example, the heating element 110 (FIG. 4) a first trip 154 can occur between S0 and S1 as the first occurrence in which the heater element 110 (FIG. 4) goes from operationally powered to depowered or off. Alternatively, a first trip or a trip 156 can be the first shut-off or trip of the heating element 110 (FIG. 4) triggered by the thermostat 112.

Figure 6:
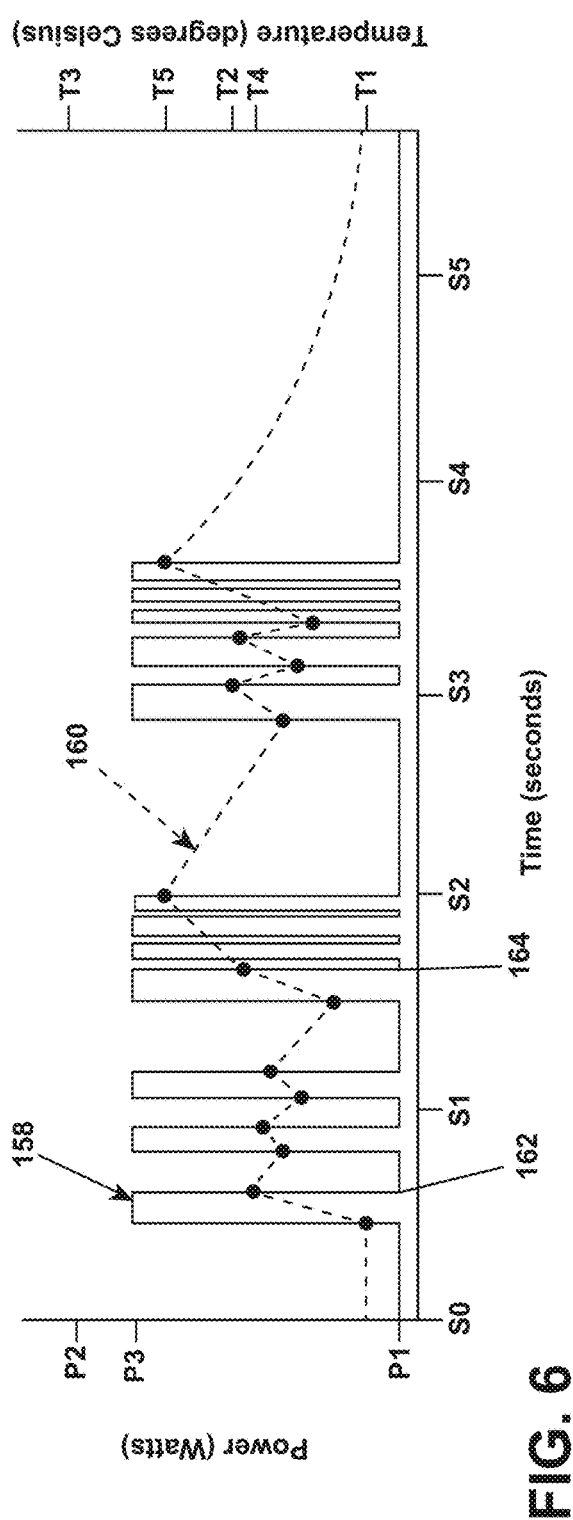
FIG. 6 is a variation of the plot graph of FIG. 5.

FIG. 6 is a variation of the plot graph of FIG. 5 showing an example of a power 158 provided to the heating element 110 (FIG. 4) and a temperature 160 of the heated water provided by the water heating assembly 90 (FIG. 4) verses time in seconds when calcification is present. That is, FIG. 6 is a non-limiting example of a graph illustrating the power 158 and the temperature 160 when the level of calcification or calcification layer 124 (FIG. 4) is no longer negligible.

A fourth temperature T4 illustrates the temperature of the water at the end of at least the first heating cycle. That is, the fourth temperature T4 correlates to the water temperature of the water heating assembly 90 (FIG. 4) when the heating element 110 (FIG. 4) is first tripped, or power is removed from the heating element 110 (FIG. 4) at a point 162 and calcification is present. It is contemplated that the thermostat 112 (FIG. 4) can trip the heating element 110 (FIG. 4), however, it is also contemplated that the power 158 can be removed from the heating element 110 (FIG. 4) due to a maxim length of time in which the heater element 110 (FIG. 4), according to the cycle of operation, is reached.

The fourth temperate T4 is less than the second temperature T2 indicative of the water temperature of the water heating assembly 90 (FIG. 4) when the heating element 110 (FIG. 4) is first tripped when calcification is minimal or not present.

A fifth temperature T5 indicates the maximum water temperature reached during the cycle of operation between times S0 and S5 at a trip 164. The fifth temperature T5 is less than the third temperature T3 from the uncalcified example. Therefore, the water temperature between S0 and S5.

In FIG. 5, between S1 and S2, the heating element 110 (FIG. 4) shuts off from being "on" twice, by way of example. In FIG. 6, between S1 and S2, the heating element 110 (FIG. 4) shuts off or is tripped five times. As detailed in FIG. 7 and FIG. 8, the HCD module 132 (FIG. 3) or controller 22 can determine the level of calcification of the water heating assembly 90 (FIG. 3 and FIG. 4) based on comparing temperature values of the current cycle of operation and threshold values based on a cycle of operation of a dishwasher 10 without calcification.

Figure 7:
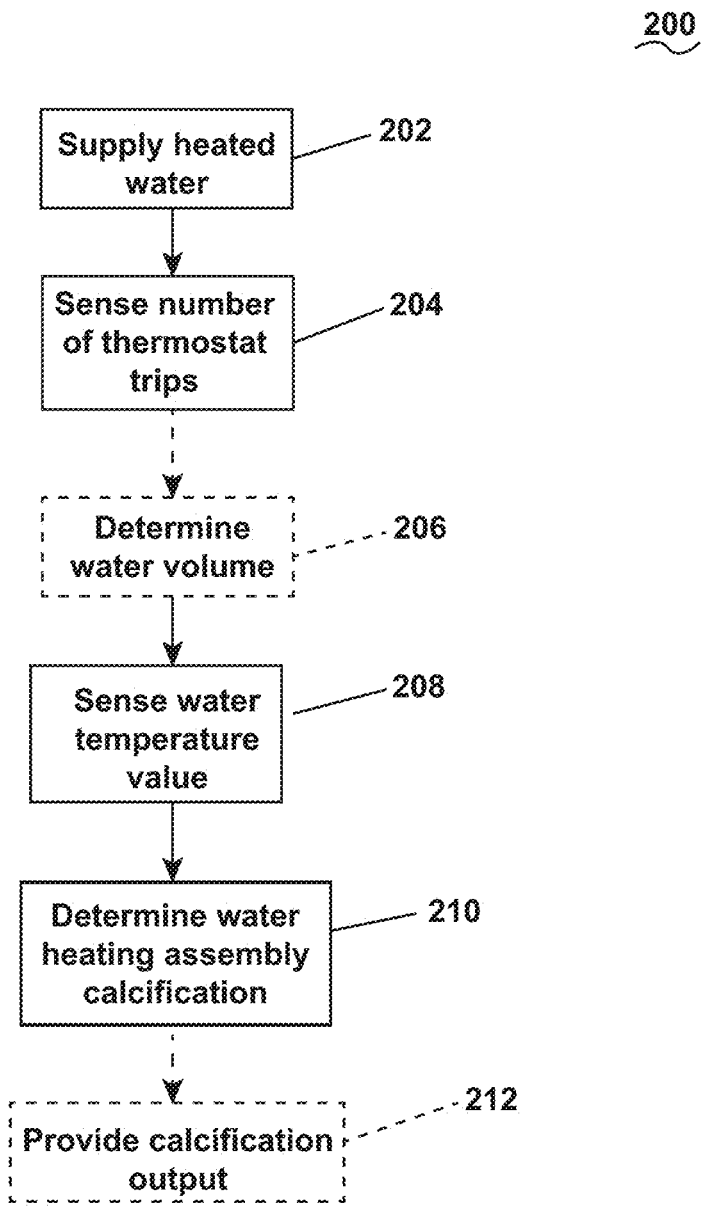
FIG. 7 is a flow chart illustrating a method of determining calcification the water heating assembly of FIG. 3.
Figure 8:
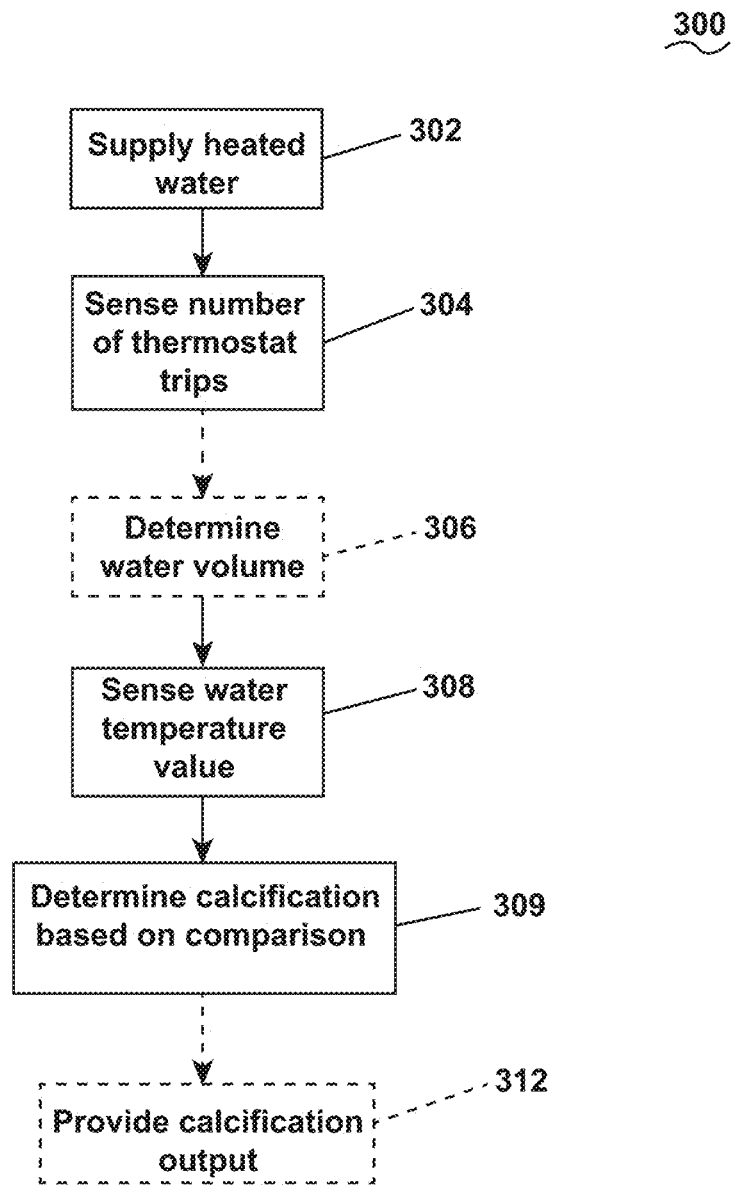
FIG. 8 is variation of the flow chart of the method of FIG. 7.

FIG. 7 illustrates a method 200 of determining calcification of a at least a portion of the water heating assembly 90 in a home appliance, illustrated as a dishwasher 10. At 202, heated water is supplied to the treating chamber 16. The heated water is provided according to a cycle of operation. The recirculation pump 53 can be operated, for example by the controller 22, to pump water through the water heating assembly 90. The heating element 110 of the water heating assembly 90 can be selectively energized, for example, by the controller 22 according to the thermostat 112. The heating element 110, when energized, heats the water as if flows through the water heating assembly 90 prior to entering the treating chamber 16.

At 204, the number of thermostats 112 trips can be sensed. That is, the controller 22 or HCD module 132 can sense the number of times the thermostat 112 trips during at least a portion of the cycle of operation. By way of non-limiting example, the detection of the trip of the thermostat 112 can be through communication between the thermostat 112 and the controller 22 or the detection of the current or calculated power provided to the heating element 110.

Optionally, at 206, the water volume passing through the water heating assembly 90 can be determined at the HCD module 132 or controller 22. The determined water volume can be compared to a water volume threshold. If it is determined by the comparing that an insufficient water volume is supplied to the water heating assembly 90, the number of thermostat 112 trips corresponding to the insufficient water volume is subtracting from the sensed number of thermostat trips. However, if it is determined that sufficient water volume is supplied to the water heating assembly 90, the number of thermostat 112 trips remains unchanged.

The water volume or the determination of insufficient water can be determined by sensing at least one characteristic of electricity supplied to the motor of the recirculation pump 53. Additionally, or alternatively, the water volume or the determination of insufficient water can be determined via input at the controller 22 from one or more of a pressure switch or other water level sensor 140.

The determining the water volume at 206 corresponding to the thermostat 112 trips ensures the calcification level is not determined based on thermostat 112 trips corresponding to insufficient water volume.

Optionally, the number of trips of the thermostat 112 can be compared to a threshold value. If the number of trips of the thermostat 112 does not exceed the threshold value, the method 200 is complete. If the number of trips of the thermostat 112 exceeds the threshold value, at 208, the water temperature value is sensed. Alternatively, the water temperature value can be sensed before the comparison of the number of trips of the thermostat 112 to a threshold value.

At 208, the water temperature value can be determined from one or more outputs provided by at least the temperature sensor 120 in communication with the HCD module 132 or controller 22. The water temperature value sensed can correspond to at least one of the thermostat 112 trips, including the first thermostat 112 trip. That is, each time the thermostat 112 is tripped, a water temperature value corresponding to each thermostat 112 trip is sensed. The sensing of the water temperature value can be at the controller 22. That is, the controller 22 can prompt the temperature sensor 120 to provide an output each time the thermostat 112 trip happens, or the controller 22 can record from the continuous output from the temperature sensor 120, the water temperature value corresponding to each of the thermostat 112 trips. Each of the sensed water temperature values corresponding to each of the thermostat 112 trips can be compared to one or more water temperature thresholds.

At 210, a calcification level of the water heating assembly 90 is determined at the HCD module 132 or controller 22. The calcification level can be based on the sensed number of thermostat 112 trips and the water temperature value corresponding to the thermostat 112 trips.

The calcification level can be a numeric value from 1 to 4, where "calcification level 1" corresponds to "none", "calcification level 2" corresponds to "low", "calcification level 3" corresponds to "medium", and "calcification level 4" corresponds to "high".

Calcification level 1 (none) could indicate little to no calcification was detected. Calcification level 1 could also indicate that the number of trips of the thermostat 112 is less than a first threshold value. Further, calcification level 1 could indicate that the water temperature for at least one thermostat trip meets or exceeds a first water temperature threshold.

Calcification level 2 (low) could indicate intermittently detected calcification or a small amount of calcification is detected. Calcification level 2 could also indicate that the number of trips of the thermostat 112 is greater than the first threshold value but less than a second threshold value. Further, calcification level 2 could indicate that the water temperature for at least one thermostat trip is less than the first water temperature threshold but greater than or equal to a second water temperature threshold.

Calcification level 3 (medium) indicates an increased amount of calcification over level 2, but less calcification than level 4 (high). Calcification level 3 could also indicate that the number of trips of the thermostat 112 is greater than the second threshold value but less than a third threshold value. Further, calcification level 3 could indicate that the water temperature for at least one thermostat trip is less than the second water temperature threshold but greater than or equal to a third water temperature threshold.

Calcification level 4 could indicate that the number of trips of the thermostat 112 is greater than the third threshold value. Further, calcification level 4 could indicate that the water temperature for at least one thermostat trip is less than the third water temperature threshold.

Note that comparing the number of trips of the thermostat 112 trips to the threshold value and the comparing the water temperature value corresponding to each of those trips to the one or more water temperature thresholds improves accuracy and eliminates incorrect determinations of calcification. That is, the number of thermostat 112 trips and the water temperature value corresponding to those trips results in an accurate determination of the calcification level of the water heating assembly 90.

The categories of calcification levels 1-4 can be a wider range of categories, such as calcification levels 0-6, where calcification level 0 indicates no calcification, calcification level 6 is indicative of a high level of calcification, and the calcification level between are intermittent levels of calcification. It is also contemplated that a non-category approach can be taken, where the number of trips and the corresponding water temperature values are compared, respectively, to a single threshold to determine calcification level as calcified or uncalcified.

Optionally, at 212, a calcification output is provided based on the determined calcification level of the water heating assembly 90. The calcification output can be communicated to the user interface 24 from the HCD module 132 or controller 22. That is, at the calcification portion 25 of the user interface 24 can display the calcification output. The calcification output can be a number 1-4 indicative of the calcification level. Additionally, or alternatively, the calcification output displayed at the calcification portion 25 of the user interface 24 can be indicative of adding salt to a water softener.

Further, the calcification output can be a recommended number of cycles before a decalcification cycle is recommended or required as calculated by the HCD module 134 of the controller 22 based on the calcification level. That is, at the decalcification cycle indicator 26 of the user interface 24, a recommended number of cycles can be displayed that is indicative of a number of cycles that can be performed before a decalcification cycle is required or recommended. When the decalcification cycle is recommended, the user is provided a prompt at, for example, the decalcification cycle indicator 26 to execute the decalcification cycle. Optionally, upon selection by a user at the decalcification cycle indicator 26 or another portion of the user interface 24, a decalcification cycle can be initiated.

If a decalcification cycle is required, the controller 22 can alert the user via the user interface 24. That is, the dishwasher 10 cannot perform any other cycle of operation until the decalcification cycle is complete.

It is contemplated that the dishwasher 10 can automatically initiate the decalcification cycle based on, for example, the determined calcification level. During the automatic decalcification cycle, the calcification output can be an indication that the automatic decalcification cycle is running.

It is contemplated that the calcification output is only displayed for calcification levels 2-4 or calcification levels 3-4. It is further contemplated that displaying the calcification output indicative of calcification level 4 or zero remaining wash cycles remain before recommended calcification can disabling all other cycles except the decalcification cycle until the decalcification cycle is selected at the calcification portion 25, the decalcification cycle indicator 26, or another portion of the user interface 24. Alternatively, when the controller 22 detects a calcification level 4 or zero more cycles before required decalcification cycle, the dishwasher 10 via the controller 22, can automatically run the decalcification cycle.

Effects can be added to the displayed calcification output. The displayed calcification outputs can blink, display different symbols, display different colors for the same symbol, or provide an audible alarm indicative of the calcification level 3-4.

Cycle modifications can be made to decrease calcification. That is, for example, if 30 consecutive cycles are run at a low temperature (less than 60 degrees Celsius), the controller 22 will automatically increase the temperature of the next cycle of operation.

FIG. 6 illustrates a method 300 of determining calcification of a at least a portion of the water heating assembly 90 in a home appliance, illustrated as a dishwasher 10. The method 300 is similar to the method 200, with it being understood that the description of the like parts of the method 200 applies to the method 300 unless otherwise noted.

At 302, similar to 202, heated water is supplied to the treating chamber 16 via the water heating assembly 90. The heating element 110 of the water heating assembly 90 can be selectively energized, for example, by the controller 22 according to the thermostat 112. The heating element 110, when energized, heats the water as if flows through the water heating assembly 90 prior to entering the treating chamber 16.

At 304, the number of thermostats 112 trips can be sensed. That is, the controller 22 can sense the number of times the thermostat 112 trips during at least a portion of the cycle of operation. By way of non-limiting example, the detection of the trip of the thermostat 112 can be through communication between the thermostat 112 and the controller 22 or the detection of the current or calculated power provided to the heating element 110.

Optionally, at 306, the water volume passing through the water heating assembly 90 can be determined. The determined water volume can be compared to a water volume threshold. If insufficient water volume is supplied to the water heating assembly 90, the number of thermostat 112 trips corresponding to the insufficient water volume is subtracting from the sensed number of thermostat trips. The water volume or the determination of insufficient water can be determined by sensing at least one characteristic of electricity supplied to the motor of the recirculation pump 53.

At 308, the water temperature value is sensed. The water temperature value can be determined from one or more outputs provided by at least the temperature sensor 120. The water temperature value sensed corresponds to at least one of the thermostat 112 trips, including the first thermostat 112 trip. That is, each time the thermostat 112 is tripped, a water temperature value corresponding to each thermostat 112 trip is sensed. The sensing of the water temperature value can be at the controller 22. That is, the controller 22 can prompt the temperature sensor 120 to provide an output each time the thermostat 112 trip happens, or the controller 22 can record from the continuous output from the temperature sensor 120, the water temperature value corresponding to each of the thermostat 112 trips.

At 309, the number of thermostat trips is compared to one or more the thermostat trip thresholds and the water temperature value corresponding to the one or more thermostat trips is compared to one or more water temperature thresholds at the HCD module 132 or controller 22. If the thermostat trips satisfies the thermostat trip threshold and the water temperature value satisfies the water temperature threshold, calcification of the heating element 110 or a portion of the water heating assembly 90 is determined.

Optionally, at 312, a calcification output is provided indicating the determination of calcification of the water heating assembly 90. That is, at the calcification portion 25 of the user interface 24 can display the calcification output as letters, numbers, symbols, or any other visual or audial indication that communicate whether calcification of a portion of the water heating assembly 90 is detected. By way of non-limiting example, the calcification portion 25 can provide an indictor indicative of a decalcification cycle. That is, the calcification portion 25 can read "decalcification cycle recommended." Alternatively, the calcification portion 25 can read "add salt" to water softener 78.

Benefits of aspects of the disclosure include early detection of calcification in the heating assembly and prompt a user to select a decalcification cycle or automatically run a decalcification cycle, which can extend the life of the appliance.

Another benefit is the determination of calcification while considering the hydraulic system. Thermostat trips occurring when the water heating assembly isn't receiving enough water are discounted when determining calcification.

Yet another benefit is determining a calcification level which provides earlier detection of calcification. The calcification level can determine how many more cycles of operation on dishes can be performed before requiring or recommending a decalcification cycle. A numerical assignment to each level of calcification can provide additional information to the user.

The user interface can communicate information about the calcification level or determination of calcification. This allows a user to add salt or select a decalcification cycle as needed.

Proper timing of a decalcification cycle can improve wash quality and length the life of the household appliance.

While "a set of" or "a plurality of" various elements will be described, it will be understood that "a set" or "a plurality" can include any number of the respective elements, including only one element. It should be understood that the term dishes herein can be cutlery, glasses, bowls, plates, appliance parts, cooking utensils, or the like.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

Further aspects of the disclosure are provided by the subject matter of the following clauses:

A method of determining calcification of at least a portion of a water heating assembly in a home appliance having a treating chamber, the method comprising supplying heated water to the treating chamber according to a cycle of operation by operating a pump to flow water through the water heating assembly to the treating chamber, and selectively energizing a heating element of the water heating assembly according to a thermostat to heat the water as it flows through the water heating assembly, sensing a number of thermostat trips during at least a portion of the cycle of operation, sensing a water temperature value indicative of a water temperature of the heated water corresponding to at least one of the thermostat trips, and determining a calcification level of the water heating assembly based on the number of thermostat trips and the water temperature value.

The method of the preceding clause, further comprising providing a calcification output based on the determined calcification level of the heating element or a portion of the water heating assembly.

The method of any preceding clause, wherein the providing the calcification output comprises displaying the calcification output on a user interface of the home appliance.

The method of any preceding clause, wherein the displaying the calcification output includes an indictor indicative of a decalcification cycle.

The method of any preceding clause, wherein the displaying the calcification output indicative of the decalcification cycle comprises disabling other cycles of operation until the decalcification cycle is selected at the user interface.

The method of any preceding clause, wherein the providing the calcification output on the user interface comprises displaying an indicator indicative of adding salt to a water softener.

The method of any preceding clause, wherein the determining the calcification level comprises comparing the number of thermostat trips to a threshold value.

The method of any preceding clause, wherein the sensing the water temperature value comprises sensing the water temperature for the at least one of the thermostat trips and comparing the water temperature for the at least one thermostat trip to a water temperature threshold.

The method of any preceding clause, wherein the sensing the water temperature value comprises sensing the water temperature for the at least one of the thermostat trips.

The method of any preceding clause, wherein the determining the calcification level comprises determining when the sensed water temperature of a first thermostat trip satisfies a water temperature threshold.

The method of any preceding clause, further comprising determining water volume supplied to the water heating assembly.

The method of any preceding clause, wherein the determining the water volume further includes comparing the water volume to a water volume threshold, wherein when the water threshold value is met, subtracting from the number of thermostat trips the thermostat trips detected when insufficient water is supplied to the water heating assembly.

The method of any preceding clause, wherein the determining the water volume comprises sensing at least one characteristic of electricity supplied to a motor of the pump.

The method of any of any preceding clause, wherein the determining the level of calcification includes disabling other cycles of operation until the decalcification cycle is selected.

The method of any of any preceding clause, wherein the determining the level of calcification includes determining the calcification level as a number value between 1-4 and displaying the calcification output as the calcification level number value.

A method of determining calcification of a heating element of a water heating assembly in a home appliance having a treating chamber, the method comprising supplying heated water to the treating chamber according to a cycle of operation by operating a pump to flow water through the water heating assembly to the treating chamber, and selectively energizing the heating element of the water heating assembly according to a thermostat to heat the water as it flows through the water heating assembly, sensing a number of thermostat trips during the cycle of operation, sensing a water temperature value indicative of a water temperature of the heated water corresponding to a first thermostat trip, and determining calcification of a portion of the water heating assembly when the number of thermostat trips satisfies a thermostat trip threshold and the water temperature value satisfies a water temperature threshold.

The method of any preceding clause, wherein the number of thermostat trips excludes thermostat trips when insufficient water is supplied to the water heating assembly.

The method of any preceding clause, wherein determining when insufficient water is supplied to the water heating assembly comprises sensing at least one characteristic of electricity supplied to a motor of the pump.

The method of any preceding clause, further comprising providing a calcification output indicating the determination of calcification.

The method of any preceding clause, wherein the providing the calcification output comprises providing the calcification output on a user interface of the home appliance.

The method of any preceding clause, wherein the providing an indication on the user interface comprises displaying an indictor indicative of a decalcification cycle.

The method of any preceding clause, wherein the providing an indication on the user interface comprises displaying an indicator indicative of adding salt to a water softener.

What is claimed is:

1. A method of determining calcification of at least a portion of a water heating assembly in a home appliance having a treating chamber, the method comprising:
   supplying heated water to the treating chamber according to a cycle of operation by operating a pump to flow water through the water heating assembly to the treating chamber, and selectively energizing a heating element of the water heating assembly according to a thermostat to heat the water as it flows through the water heating assembly;
   sensing a number of thermostat trips during at least a portion of the cycle of operation;
   sensing a water temperature value indicative of a water temperature of the heated water corresponding to at least one of the thermostat trips; and
   determining a calcification level of the water heating assembly based on the number of thermostat trips and the water temperature value.

2. The method of claim 1, further comprising providing a calcification output based on the determined calcification level of the heating element or a portion of the water heating assembly.

3. The method of claim 2, wherein the providing the calcification output comprises displaying the calcification output on a user interface of the home appliance.

4. The method of claim 3, wherein the displaying the calcification output includes an indictor indicative of a decalcification cycle.

5. The method of claim 4, wherein the displaying the calcification output indicative of the decalcification cycle comprises disabling other cycles of operation until the decalcification cycle is selected at the user interface.

6. The method of claim 3, wherein the providing the calcification output on the user interface comprises displaying an indicator indicative of adding salt to a water softener.

7. The method of claim 1, wherein the determining the calcification level comprises comparing the number of thermostat trips to a threshold value.

8. The method of claim 1, wherein the sensing the water temperature value comprises sensing the water temperature for the at least one of the thermostat trips and comparing the water temperature for the at least one thermostat trip to a water temperature threshold.

9. The method of claim 1, wherein the sensing the water temperature value comprises sensing the water temperature for the at least one of the thermostat trips.

10. The method of claim 9, wherein the determining the calcification level comprises determining when the sensed water temperature of a first thermostat trip satisfies a water temperature threshold.

11. The method of claim 1, further comprising determining water volume supplied to the water heating assembly.

12. The method of claim 11, wherein the determining the water volume further includes comparing the determined water volume to a water volume threshold, wherein when the water volume threshold value is met, subtracting from the number of thermostat trips the thermostat trips detected when insufficient water is supplied to the water heating assembly.

13. The method of claim 12, wherein the determining the water volume comprises sensing at least one characteristic of electricity supplied to a motor of the pump.

14. The method of claim 1, wherein the determining the level of calcification includes disabling other cycles of operation until a decalcification cycle is selected.

15. The method of claim 1, wherein the determining the level of calcification includes determining the calcification level as a number value between 1-4 and displaying a calcification output as the calcification level number value.

16. A method of determining calcification of a heating element of a water heating assembly in a home appliance having a treating chamber, the method comprising:
- supplying heated water to the treating chamber according to a cycle of operation by operating a pump to flow water through the water heating assembly to the treating chamber, and selectively energizing the heating element of the water heating assembly according to a thermostat to heat the water as it flows through the water heating assembly;
- sensing a number of thermostat trips during the cycle of operation;
- sensing a water temperature value indicative of a water temperature of the heated water corresponding to a first thermostat trip; and
- determining calcification of a portion of the water heating assembly when the number of thermostat trips satisfies a thermostat trip threshold and the water temperature value satisfies a water temperature threshold.

17. The method of claim 16, wherein the number of thermostat trips excludes thermostat trips when insufficient water is supplied to the water heating assembly.

18. The method of claim 17, wherein determining when insufficient water is supplied to the water heating assembly comprises sensing at least one characteristic of electricity supplied to a motor of the pump.

19. The method of claim 16, further comprising providing a calcification output indicating the determination of calcification.

20. The method of claim 19, wherein the providing the calcification output comprises providing the calcification output on a user interface of the home appliance, wherein the user interface displays an indictor indicative of a decalcification cycle or an indicator indicative of adding salt to a water softener.

* * * * *